United States Patent [19]

Buzio et al.

[11] 4,259,412
[45] Mar. 31, 1981

[54] FLEXIBLE DOUBLE-LAYER POLYPROPYLENE LAMINATES

[75] Inventors: Pierpaolo Buzio, Rho; Lucio Edefonti, Busto Arsizio, both of Italy

[73] Assignee: Societa' Italiana Resine S.I.R. S.p.A., Milan, Italy

[21] Appl. No.: 64,702

[22] Filed: Aug. 8, 1979

[30] Foreign Application Priority Data

Aug. 8, 1978 [IT] Italy ........................ 26567 A/78

[51] Int. Cl.$^3$ .............................................. B32B 27/08
[52] U.S. Cl. .................................... 428/516; 156/331; 156/324.4; 427/411; 428/500; 428/910; 428/424.8
[58] Field of Search ............... 428/516, 500, 910, 424; 427/411; 156/306, 309, 331

[56] References Cited

U.S. PATENT DOCUMENTS

| 3,607,616 | 9/1971 | Barbehenn | 428/516 |
|---|---|---|---|
| 3,666,585 | 5/1972 | Barbehenn | 428/910 |
| 3,862,869 | 1/1975 | Peterson | 428/910 |
| 3,887,755 | 6/1975 | Zammer | 428/424 |
| 3,965,271 | 6/1976 | Harrington | 428/910 |
| 3,995,087 | 11/1976 | DeSanzo | 428/910 |
| 4,046,945 | 9/1977 | Baxmann et al. | 428/516 |
| 4,085,244 | 4/1978 | Stillman | 428/516 |
| 4,163,080 | 7/1979 | Buzio et al. | 428/424.8 |

FOREIGN PATENT DOCUMENTS 766728 9/1967 Canada ........................ 428/910

Primary Examiner—George F. Lesmes
Assistant Examiner—E. Rollins Buffalow
Attorney, Agent, or Firm—Sughrue, Rothwell, Mion, Zinn and Macpeak

[57] ABSTRACT

Flexible double-layer polypropylene laminate consisting essentially of a biaxially oriented film of isotactic polypropylene with an atactic polypropylene content of less than 6% by weight and an intrinsic viscosity of from 1.5 to 3 dl/g, adhesively bonded to a non-oriented film of isotactic polypropylene with an atactic polypropylene content of from 15 to 30% by weight, said polypropylene in said non-oriented film deriving directly from the polymerization of propylene and having an intrinsic viscosity of from 2 to 8 dl/g.

10 Claims, No Drawings

FLEXIBLE DOUBLE-LAYER POLYPROPYLENE LAMINATES

The present invention relates to flexible and heat-sealable double-layer polypropylene laminates for the packaging of food products, and in particular pasta foods.

Recently in the packaging field, especially in the food product sector, the use of film laminates for packaging has been developed more and more. By film laminates are intended the materials resulting from the lamination of two or more films with different characteristics, which have a combination of the various characteristics of the component films used.

In the field of packaging food products, especially those intended to have a long shelf life, or anyway to be kept for a long time in a warehouse, a whole series of properties are required for the packaging and it is practically impossible to unite these in a single film, especially since very often the required properties are in contradiction with one another. Thus, for example, for prolonged storage, satisfactory barrier qualities, especially towards gas and steam, and impermeability to grease and smells are required while for good handling qualities of the packages, the possibility of filling while hot, high resistance to damage by knocking and ease of labelling are required.

With the lamination of two or more films with different characteristics, these difficulties can be overcome by the realisation of various combinations of properties, even if in contradiction with one another, which make possible the solution of specific problems in the packaging field.

One of the laminates more used for the preparation of packagings for food products, particularly for products perishable through the effect of dampness, is the material obtained by laminating a biaxially oriented isotactic polypropylene film with a low density, polyethylene film. In this material the polyethylene allows the welding and hence the closing of the packages, particularly of envelopes and bags, while the biaxially oriented polypropylene film gives mechanical durability and impermeability to steam.

The laminated, biaxially oriented isotactic polypropylene/polyethylene films have, however, several disadvantages, due above all to the polyethylene component in direct contact with the contents of the packages, which do not make them very suitable for the packaging of pasta foods.

As is known, the production cycle for pasta foods in modern industry provides for the packaging of the pasta to follow immediately after their preparation.

For this reason the pasta foods coming, still hot, from the drying oven are sent to the automatic filling machines which carry out both the formation of the packagings (envelopes, bags and parcels) starting with the laminated film and also their filling and sealing.

In particular good holding of the seals when hot is required to permit the filling to be carried out, above all in the case of large quantities of hot products, without giving rise to deformation or worse, opening of the seals with escape and loss of the products.

High strength of the seals is also required to permit the packages to bear all the handling which occurs during transport and distribution of the packages without tear and damage of the said seals.

These characteristics are not possessed by biaxially oriented polypropylene/polyethylene laminated films, particularly the polyethylene component.

Furthermore, especially for pasta with pointed shapes, such as spaghetti and short pasta, good resistance to piercing and resistance to abrasion are required for the packages, the first to avoid tearing of the packages and the second to prevent formation of lines of opaqueness which reduce the transparency and shine of the packages.

In the art polyolefin laminates have been considered in which the outer layer always consists of a film of oriented polypropylene, while the inner layer consists of a film produced from a mixture in which low-density polyethylene is partially or completely substituted by isotactic polypropylene or by ethylene/propylene copolymers which, besides having good characteristics of resistance to piercing and resistance to abrasion also give an improved seal strength. These laminated films are not, however, completely satisfactory especially with regard to the holding of the seal when hot.

In our co-pending application Ser. No. 895,822 filed on Apr. 13, 1978 now Pat. No. 4,163,080 there are described film laminates suitable for the packaging of food products obtained by laminating a biaxially oriented isotactic polypropylene film, having an atactic fraction content lower than 6% by weight, with a non-oriented film obtained from a physical mixture of isotactic polypropylene and atactic polypropylene, the latter being present in the mixture in amounts of from 15 to 30% by weight. In particular, the isotactic component of the mixture should have an intrinsic viscosity of from 1.0 to 1.5 dl/g, as measured at 135° C. in solution in decahydronaphthalene, and the atactic component should have a density of from 0.855 to 0.865 g/cm$^3$ and a viscosity when fused at 160° C., of from 3,000 to 10,000 cps.

It has now been found that further advantages can be achieved when in the laminates described in the said co-pending application, the non-oriented film is constituted by isotactic polypropylene, containing from 15 to 30% by weight of atactic fraction, said polypropylene deriving directly from the polymerization of propylene.

Thus the invention provides a flexible double-layer polypropylene laminate consisting essentially of a biaxially oriented film consisting essentially of isotactic polypropylene with an atactic polypropylene content of less than 6% by weight and an intrinsic viscosity, measured in accordance with standard ASTM D 1601, of from 1.5 to 3.0 dl/g, adhesively bonded to a non-oriented film consisting essentially of isotactic polypropylene with an atactic polypropylene content of from 15 to 30% by weight, said polypropylene in said non-oriented film deriving directly from the polymerization of propylene and having an intrinsic viscosity of from 2 to 8 dl/g, as measured in accordance with standard ASTM D 1601.

Intrinsic viscosities measured in accordance with ASTM D 1601 are measured in decahydronaphthalene at 135° C., usually on an Ubbelohde viscometer.

The percentages of atactic polypropylene are given with reference to the total portions which can be extracted in n-heptane in eight hours of boiling at atmospheric pressure.

Isotactic polypropylene having a relatively high content in atactic fraction (15–30% by weight) is known in the art and can be prepared by polymerization of propylene monomer in the gaseous phase, at 70°–120° C., under a pressure of 10–100 atmospheres, with those Ziegler catalysts which permit a high polymerization yield. Such a process is described for example in Italian Pat. No. 885,826.

Therefore, in place of the mechanical mixture described in said co-pending application, there is used, according to the present invention, a propylene polymer whose characteristics (in particular the content of isotactic and atactic fractions) depend on the operative conditions which are selected for the polymerization. This polypropylene is formed into a film and said film (non-oriented) in combination with a biaxially oriented polypropylene film, constitutes the laminate of the present invention. This laminate has improved characteristics, especially as regards the holding of the weld when hot, the values of which are surprisingly high. As a result, the laminate of the present invention can be advantageously used for the packaging of food products, and in particular pasta foods.

The biaxially oriented film and the non-oriented film can be laminated by means of conventional lamination techniques by using an adhesive. The adhesive, generally diluted with a solvent, is conveniently smeared on the supporting film (biaxially oriented polypropylene) or on both films in quantities (as dry matter) of from 1.5 to 3.0 g/m² of surface. The possible solvent is then evaporated by passage through a drying tunnel, using a hot gas such as hot air. The lamination of the films is carried out, according to a known technique, by passage between two laminating cylinders, operating at a temperature which depends on the nature of the adhesive used and which is generally of from 60° to 80° C.

It may be convenient in some cases to pretreat the surfaces of the films which are made to adhere, before the application of the adhesive, according to one of the known methods for increasing the adhesion of plastics films, such as flame treatment, chemical treatment, or treatment with electric discharges emitted by high-frequency generators.

The adhesive can be of the thermoplastic or thermosetting type; in this latter case it generally comprises several components which are mixed a little before the application. Advantageously, there are used polyurethane adhesives, generally dissolved in organic solvents such as methyl ethyl ketone and ethyl acetate. The concentration of the adhesive in the related solution may range from 15 to 40% by weight.

The extrusion of the polypropylene having an atactic fraction content lower than 6% by weight and the aforesaid viscosity values, and the stretching of the film thus obtained, are carried out according to conventional methods. The thickness of the biaxially oriented film is conveniently of from 20 to 75 microns, preferably 20–35 microns. Prior to the extrusion, the polypropylene is conveniently admixed with suitable additives such as stabilizers, lubricants and pigments.

The polypropylene having an atactic fraction content of from 15 to 30% by weight is conveniently extruded in the form of a film having also a thickness in the aforesaid ranges of values. Prior to the extrusion, the polymer is conveniently admixed with a phenolic antioxidant (0.05–0.2% by weight) and a slip agent such as an amide of a fatty acid, saturated or unsaturated, or else a tertiary aliphatic amine (0.05–0.2% by weight).

The said slip agent is generally added in mixture with inert fillers such as silica and diatomite, used in amounts not exceeding 0.2% by weight.

As stated in the foregoing, the polypropylene suitable for the production of the non-oriented film has an intrinsic viscosity of from 2 to 8 dl/g, the preferred values being generally of the order of 2 to 4 dl/g. Still preferably, said polypropylene has a density of about 0.89 g/ml and a melting range of the order of 167°–172° C.

EXAMPLE 1

There is prepared an isotactic polypropylene film having an atactic fraction content lower than 5% by weight and an intrinsic viscosity of 2.3 dl/g, as measured under the aforesaid conditions.

The polypropylene is extruded through a straight slit which ensures that the film obtained has a thickness of about 1000 microns. After cooling on rollers provided with internal cooling means, the film is stretched longitudinally by means of a series of rollers rotating at different speeds and then transversally in a machine of the "rameuse" type.

The biaxially oriented film, having a thickness of about 25 microns, has a longitudinal tensile strength of 11 kg/sq.mm. and a transverse tensile strength of 22 kg/sq.mm. (ASTM D-882).

The biaxially oriented polypropylene film is then coated with a polyurethane adhesive known under the trade name UNOFLEX of the Polymer Industries Company. The adhesive is used in the form of a 25 wt.% solution in methyl ethyl ketone and is applied in amounts of 3 g/m² (as dry matter) by means of a system of rollers dipping into a basin containing the solution. The coated film is then passed through a tunnel through which hot air is circulated at a temperature of 70° C. to evaporate the solvent.

The non-oriented film is prepared from a polypropylene known under the trade name NOVOLEN 1320 LL of the Badische Aniline und Soda Fabrik Company.

This polypropylene has an atactic fraction content of about 20% by weight and the following characteristics:
intrinsic viscosity: 3 dl/g (ASTM D 1601)
density: 0892 g/ml (ASTM D-1.505)
melt-index: 6 g/10 minutes (ASTM D-1238)
melting range: 167°–172° C. (ASTM D-2117).

This polypropylene is admixed with 0.2 parts by weight for each 100 parts by weight of polypropylene, of the amide of erucic acid (commercialized under the trade name NEUTRON S by the Fine Chemicals Company), 0.1 part by weight for each 100 parts by weight of polypropylene, of the antioxidant product IRGANOX 1076 of the CIBA company and 0.1 part by weight for each 100 parts by weight of polypropylene, of silica (commercialized under the trade name SYLOID by the Grace company). The extrusion is carried out through a straight slit and the resulting non-oriented film has a thickness of 25 microns, a modulus of elasticity of 155 kg/mm² (ASTM D-882), a coefficient of static friction (Slip) of 0.18 (ASTM D-1694) and a transparency (Haze) of 2 (ASTM D-1003).

The lamination of said non-oriented film with the biaxially oriented film coated with the adhesive, is carried out by passage between two laminating cylinders heated to 70° C.

The laminate thus obtained has a thickness of about 50 microns and the characteristics shown in Table 1. In particular, in Table 1:

the puncture resistance is determined according to the standard ASTM D-2582;

the abrasion resistance is determined according to the standard ASTM D-1044;

the holding of the weld when hot is determined by operating at 140° C., using calibrated springs of steel sheet; in practice, the operations are as follows: a ring is formed from a strip of the specimen to be tested, the edges necessary to weld it being left outside; a steel sheet, folded on itself, (calibrated spring) is inserted into the ring with its free ends near the point at which the welding of the specimen is carried out; in this way, as soon as the sealing bars open, the tendency of the sheet to straighten itself exercises a certain force which tends to tear the newly formed weld;

the strength at ambient temperature is determined on welds formed at the temperature shown by means of a Sentinel welder, with a contact time equal to 1 second and with a pressure of 2.5 kg/cm$^2$; in practice, after the welding, a test piece 1 cm in width is cut and the rupture resistance of the weld is evaluated by means of an IN-STRON dynamometer.

EXAMPLE 2 (comparative)

By way of comparison, a polypropylene laminate is prepared according to the teaching of our aforesaid co-pending application.

More particularly, the coated biaxially oriented polypropylene film prepared in Example 1 is laminated under the conditions described in Example 1 with a non-oriented polypropylene film prepared as follows. There is used a mixture of isotactic polypropylene having an intrinsic viscosity of 1.3 dl/g, as measured under the aforesaid conditions, and atactic polypropylene having a density of 0.857 g/cm$^3$ and a viscosity of 6000 cps at 160° C., the latter being used in such a quantity that the atactic polypropylene content of the non-oriented film be equal to 20% by weight.

The atactic polypropylene is the product commercialized under the trade name EAST BOND M-5W by the Eastman Kodak Company.

To each 100 parts by weight of the mixture is added 0.1 part by weight of the antioxidant product IRGANOX 1076 of the CIBA Company, about 0.2 parts by weight of the slip agent ARMID O of the AKZO Company (mixture of oleamide and palmitamide) and about 0.1 part by weight of synthetic silica (SYLOID 244 of the GRACE Company).

The resulting mixture is extruded as in Example 1, thus obtaining a non-oriented polypropylene film having a modulus of elasticity of 50 kg/mm$^2$, a coefficient of static friction (slip) of 0.45 and a transparency (haze) of 2.5.

The laminate thus obtained has a thickness of about 55 microns and the characteristics shown in Table 1.

TABLE 1

|  | Example 1 | Example 2 |
|---|---|---|
| Resistance to puncture (in grams) | 1500 | 1500 |
| Resistance to abrasion (in cycles) | >50 | 50 |
| Holding of the weld (in g/cm) at 140° C. | 400 | 80 |
| Strength of the weld (in g/cm) formed at 135° C. | 250 | 200 |
| Strength of the weld (in g/cm) formed at 140° C. | 800 | 500 |
| Strength of the weld (in g/cm) formed at 145° C. | 1000 | 1000 |

We claim:

1. A flexible double-layer polypropylene laminate consisting essentially of a biaxially oriented film consisting essentially of isotactic polypropylene with an atactic polypropylene content of less than 6% by weight and an intrinsic viscosity, measured in accordance with standard ASTM D-1601, of from 1.5 to 3.0 dl/g, adhesively bonded to a non-oriented film consisting essentially of isotactic polypropylene with an atactic polypropylene content of from 15 to 30% by weight, said polypropylene in said non-oriented film deriving directly from the polymerization of propylene and having an intrinsic viscosity of from 2 to 8 dl/g, as measured in accordance with standard ASTM D-1601.

2. The laminate of claim 1, wherein the adhesive is interposed between the biaxially oriented film and the non-oriented film in a quantity of from 1.5 to 3 g per m$^2$ of surface.

3. The laminate of claim 1, wherein a polyurethane adhesive is used as the adhesive.

4. The laminate of claim 1, wherein the polypropylene in said non-oriented film has an intrinsic viscosity of from 2 to 4 dl/g.

5. The laminate of claim 1, wherein the polypropylene in said nonoriented film and a density of about 0.89 g/ml and a melting range of about 167°–172° C.

6. The laminate of claim 1, wherein said biaxially oriented and nonoriented films have a thickness of from 20 to 75 microns.

7. The laminate of claim 1, wherein said laminate is heat-sealed, thereby providing high seal strength when the laminate is cooled and good seal holding when the laminate is hot.

8. A process for producing a flexible double-layer polypropylene laminate, which comprises preparing a biaxially oriented film consisting essentially of isotactic polypropylene with an atactic polypropylene content of less than 6% by weight and an intrinsic viscosity of from 1.5 to 3.0 dl/g, as measured in accordance with standard ASTM D-1601, and a non-oriented film consisting essentially of isotactic polypropylene with an atactic polypropylene content of from 15 to 30% by weight, said polypropylene in said non-oriented film deriving directly from the polymerization of propylene and having an intrinsic viscosity of from 2 to 8 dl/g, as measured in accordance with standard ASTM D-1601, applying on to at least one of the surfaces to be bonded of said films an adhesive in an amount of from 1.5 to 3 g per m$^2$ of surface, and laminating the said films at a temperature of from 60° to 80° C.

9. The process of claim 8, wherein the biaxially oriented film and the non-oriented film have a thickness of from 20 to 75 microns.

10. The process of claim 8, wherein said laminating at a temperature of from 60° to 80° results in heat-sealing, thereby providing high seal strength when the laminate is cold and good seal holding when the laminate is hot.

* * * * *